(12) United States Patent
Lehtonen

(10) Patent No.: US 7,671,836 B2
(45) Date of Patent: Mar. 2, 2010

(54) CELL PHONE WITH SHIFTABLE KEYPAD

(75) Inventor: Jarmo Lehtonen, Florence (IT)

(73) Assignee: Nokia Corporation, Espoo (FI)

( * ) Notice: Subject to any disclaimer, the term of this patent is extended or adjusted under 35 U.S.C. 154(b) by 653 days.

(21) Appl. No.: 11/028,953

(22) Filed: Jan. 3, 2005

(65) Prior Publication Data

US 2006/0146014 A1 Jul. 6, 2006

(51) Int. Cl.
*H03K 17/94* (2006.01)
*H03M 11/00* (2006.01)
*G09G 5/00* (2006.01)
*G06F 3/02* (2006.01)

(52) U.S. Cl. .................. 345/156; 341/22; 345/169; 400/682; 400/683; 400/684

(58) Field of Classification Search ........... D14/331, D14/333, 341, 345–347; 341/22; 345/156, 345/168–172; 361/680; 400/82, 88, 100, 400/472–492, 682–684
See application file for complete search history.

(56) References Cited

U.S. PATENT DOCUMENTS

| | | | |
|---|---|---|---|
| 6,215,419 B1 | 4/2001 | Leman | |
| 6,507,202 B1 | 1/2003 | Sasanouchi et al. | 324/727 |
| 6,658,272 B1 | 12/2003 | Lenchik et al. | 455/575 |
| 7,071,916 B2 * | 7/2006 | Duarte et al. | 345/156 |
| 7,142,420 B2 * | 11/2006 | Santos et al. | 361/686 |
| 7,218,313 B2 * | 5/2007 | Marcus et al. | 345/169 |
| 7,422,436 B2 * | 9/2008 | Lee | 439/10 |
| 2003/0147205 A1 | 8/2003 | Murphy | |
| 2005/0070348 A1 | 3/2005 | Lee | |
| 2006/0046796 A1 * | 3/2006 | Park et al. | 455/575.4 |
| 2007/0049356 A1 * | 3/2007 | Jung et al. | 455/575.1 |

FOREIGN PATENT DOCUMENTS

| | | |
|---|---|---|
| DE | 203 17 864 I1 | 4/2004 |
| EP | 0944219 | 9/1999 |
| EP | 1108999 | 6/2001 |
| GB | 2 407 933 A | 5/2005 |
| JP | 05-304007 | 11/1993 |
| JP | 11-250757 | 9/1999 |
| JP | 2001-13016 | 1/2001 |
| JP | 2003-125053 | 4/2003 |
| JP | 2003-167666 | 6/2003 |
| JP | 2003-532351 | 10/2003 |
| JP | 2004-112431 | 4/2004 |
| JP | 2004-310406 | 11/2004 |
| JP | 2005-341480 | 12/2005 |
| KR | 20-0325998 | 8/2003 |
| KR | 20-0325998 | 9/2003 |
| KR | 10-2004-0098979 | 11/2004 |
| KR | 10-2004-0107154 | 12/2004 |

(Continued)

OTHER PUBLICATIONS

Korean Office Action dated Mar. 28, 2008, 5 pages English translation and 5 pages Korean original citing WO 03/050665 A1 and KR 20-0325998 with argumentation.

(Continued)

*Primary Examiner*—Alexander S. Beck

(57) ABSTRACT

The invention is related to electronic devices (1), preferably cell phones or handhelds, containing a layer (2) and a moving mechanism for this layer (2), so that the layer (2) is extractable out of a rest position from the main casing (10). The described layer (2) usually contains a keypad (3). According to the invention, the moving mechanism allows the layer (2) to be extractable out of his rest position in different directions, preferably in two, three, or four directions. The inventive arrangement allows a more comfortable and flexible use of the device.

14 Claims, 5 Drawing Sheets

FOREIGN PATENT DOCUMENTS

| KR | 10-2006-0032296 | 4/2006 |
|---|---|---|
| WO | 01/84269 | 11/2001 |
| WO | 03/028000 | 4/2003 |
| WO | 03/050665 | 6/2003 |
| WO | 03/056787 | 7/2003 |
| WO | 2006/041238 | 1/2005 |

OTHER PUBLICATIONS

Korean Office Action dated Sep. 25, 2008, 5 pages English translation and 5 pages Korean original.

Machine-Translated document. KR Unexamined Patent Publication, Unexamined Publication No. 10-2004-0098979, Unexamined Publication Date: Nov. 26, 2004, 11 pages.

Machine-Translated document. KR Unexamined Patent Publication, Unexamined Publication No. 10-2004-0107154, Unexamined Publication Date: Dec. 20, 2004.

Machine-Translated document. KR Examined Patent Publication, Registration No. 20-0325998, Registration Date: Aug. 28, 2003, 9 pages.

English translation of Chinese Office Action issued Jun. 6, 2009 in corresponding Chinese Application No. 200680001730.7 including a two-sheet cover notification and a three-sheet text of the Office Action (5 pages total).

Japanese Office Action issued in parallel Japanese Patent Application No. 2007-548858, issued Nov. 13, 2009 ((6 pages in original Japanese) Patent Abstracts of Japan, Publication No. 2004-112431, "Cellular Telephone," published Apr. 8, 2004 (1 page Abstract plus 10 pages Machine Translation).

Patent Abstracts of Japan, Publication No. 2005-341480, "Mobile Terminal," published Dec. 8, 2005 (1 page Abstract plus 18 pages Machine Translation).

Patent Abstracts of Japan, Publication No. 2004-310406, "Portable Electronic Apparatus," published Nov. 4, 2004 (1 page Abstract plus 18 pages Machine Translation).

Patent Abstracts of Japan, Publication No. 2003-125053, "Portable Telephone," published Apr. 25, 2003 (1 page Abstract plus 13 pages Machine Translation).

Patent Abstracts of Japan, Publication No. 2003-137666, "Portable Electronic Device," published Jun. 13, 2003 (1 page Abstract plus 17 pages Machine Translation).

Patent Abstracts of Japan, Publication No. 05-304007, "Pressure Sensitive Switch," published Nov. 16, 1993 (1 page Abstract plus 6 pages Machine Translation).

Patent Abstracts of Japan, Publication No. 11-250757, "Piezoelectric Sheet and Piezoelectric Switch," published Sep. 17, 1999 (1 page Abstract plus 17 pages Machine Translation).

Patent Abstracts of Japan, Publication No. 2008-061262, "Personal Digital Assistant," published Mar. 13, 2008 (1 page Abstract) English Language Machine Translation of JP-A-2009-213177, in same family as WO 03/056787 (24 pages).

\* cited by examiner

CELL PHONE WITH SHIFTABLE KEYPAD

BACKGROUND OF THE INVENTION

The following invention concerns an electronic device, preferably a cell phone or handheld, containing a layer and a moving mechanism for the layer, which allows the layer to be extractable out of a rest position.

Electronic devices, especially cell phones, containing layers that are slideable out of a rest position are generally known. Several manufacturers of cell phones are producing that kind of device. The publication EP 944 219 A2 discloses some cell phones of this type.

Thanks to the miniaturization of electrical components, today it is possible to reduce the size of cell phones significantly and to make them in that way very handy for carrying them around, e.g. in trouser pockets etc. On the other hand, this advantage also creates a drawback: The small size of the casing reduces the surface available for the manipulation of the cell phone and makes therefore the practical handling somewhat inconvenient. The use of a keypad that is arranged on a layer, which is slideable out of the main casing of the cell phone, offers in this respect several advantages.

It is known that the use of an additional layer, which is extractable out of the main casing, allows the device to be temporarily enlarged. This enlargement makes the surface available for the manipulation of the device bigger for the time it is being used and augments temporarily the cell phone size as a whole, permitting better handling in this way.

Although containing an extractable layer, the known types on the market offer only a limited possibility to adapt and to increase the casing surface for the manipulation of the device. This limitation has obviously been realized. An attempt to overcome this restriction is made e.g. with mechanisms like in the Nokia 9500 Communicator. This appliance shows another way to increase the casing surface in order to offer a more convenient format to the operator for manipulating the cell phone. The electronic device is foldable and opened it contains a wide screen in landscape format and a keyboard similar to the ones used for PC's. In this condition the cell phone is even suitable to be operable as a pocket PC. A drawback of this solution is the higher amount of components, which have to be integrated in the cell phone (e.g. two different displays and two different keypads). Further, used as a normal cell phone, there is no additional surface available for the manipulation of the device. The advantage to have a foldable casing is therefore not under all circumstances a benefit.

SUMMARY OF INVENTION

The problem the following invention aims to solve is to simplify the electronical device and to make its components more flexible in their use, meaning giving them multipurpose usability.

According to the present invention, an electronic device, preferably a cell phone or a handheld, containing a layer and a moving mechanism for the layer, which allows the layer to be extractable out of a rest position, is characterized in that the moving mechanism allows the layer to be extractable out of this rest position in different directions, preferably in two, three, or four directions, particularly preferably the moving mechanism is a sliding mechanism. Using layers, which are slideable out of their rest position in different directions, it is possible to use the same layer for different purposes, meaning in different configurations.

To be slideable out of the rest position, the layer is equipped with a sliding mechanism. The sliding mechanism can for instance be shaped according to the FIG. 5, which will be explained further below in this description. However, other useful sliding mechanisms are conceivable for the purpose of the invention.

In a further aspect of the invention, the layer contains one keypad or one touchscreen, whereby the display orientation of the keypad or touchscreen will vary according to the direction the layer is extracted from the rest position. In this way it is possible to use the same keypad or touchscreen in different configurations, giving them in this way a multipurpose usability.

In a preferred embodiment of the invention, the layer is extractable out of its rest position in two different directions. In this way, the electronic device can be used with the same layer—containing a keypad or a touchscreen, or a combination therefrom—in portrait or in landscape format.

The invention can be used for all kind of electronic devices. However, it is especially dedicated for cell phones or for handhelds, or for devices constituting a combination therefrom. The layer is preferably extractable out of his rest position in different directions, preferably in two, three, or four directions. Depending on the direction the layer is extracted out of the rest position, the contained keypad or touchscreen can put on view a different display.

In the case a keypad is used, that keypad can contain several mechanical keys. Preferably the mechanical keys contain pressure sensors, most preferably piezo sensors.

Where single mechanical keys are used, it is preferable to enable them to display different signs or the same sign in different directions. To allow this, there exist different possibilities. On one hand it would be possible, that the single buttons show the respective letter in different directions at the same time (by simply printing the same letter in different directions onto the buttons) or at different times, depending on the direction the layer is extracted from the main casing. In the latter case, the key might have two or more integrated lamps, illuminating the letter in the correct direction when the layer is extracted (see figures).

Instead of using buttons it would also be possible, that the keypad onto the layer comprises—at least partially—a touchscreen. With this solution the touchscreen would be enabled to display different arrangements of virtual keys, depending onto the direction the layer is extracted.

Preferably the layer in its rest position is integrally retracted within the main casing of the electronic device. It would also be imaginable and part of the invention if the device is only partly retractable within the main casing.

Usually the electronic devices in which the invention can be applied contain displays. If this is the case, it can be foreseen that the display automatically adapts its display-format according to the direction the layer is extracted. Preferably the electronical device also contains further buttons on its top surface, which can be used multidirectionally. Most preferably these buttons adapt their function or signification depending on the direction the layer is extracted.

BRIEF DESCRIPTION OF THE DRAWINGS

The invention will be described in the following with figures. However, the invention is not limited to the disclosed embodiments.

DETAILED DESCRIPTION OF THE INVENTION

Figure 1:
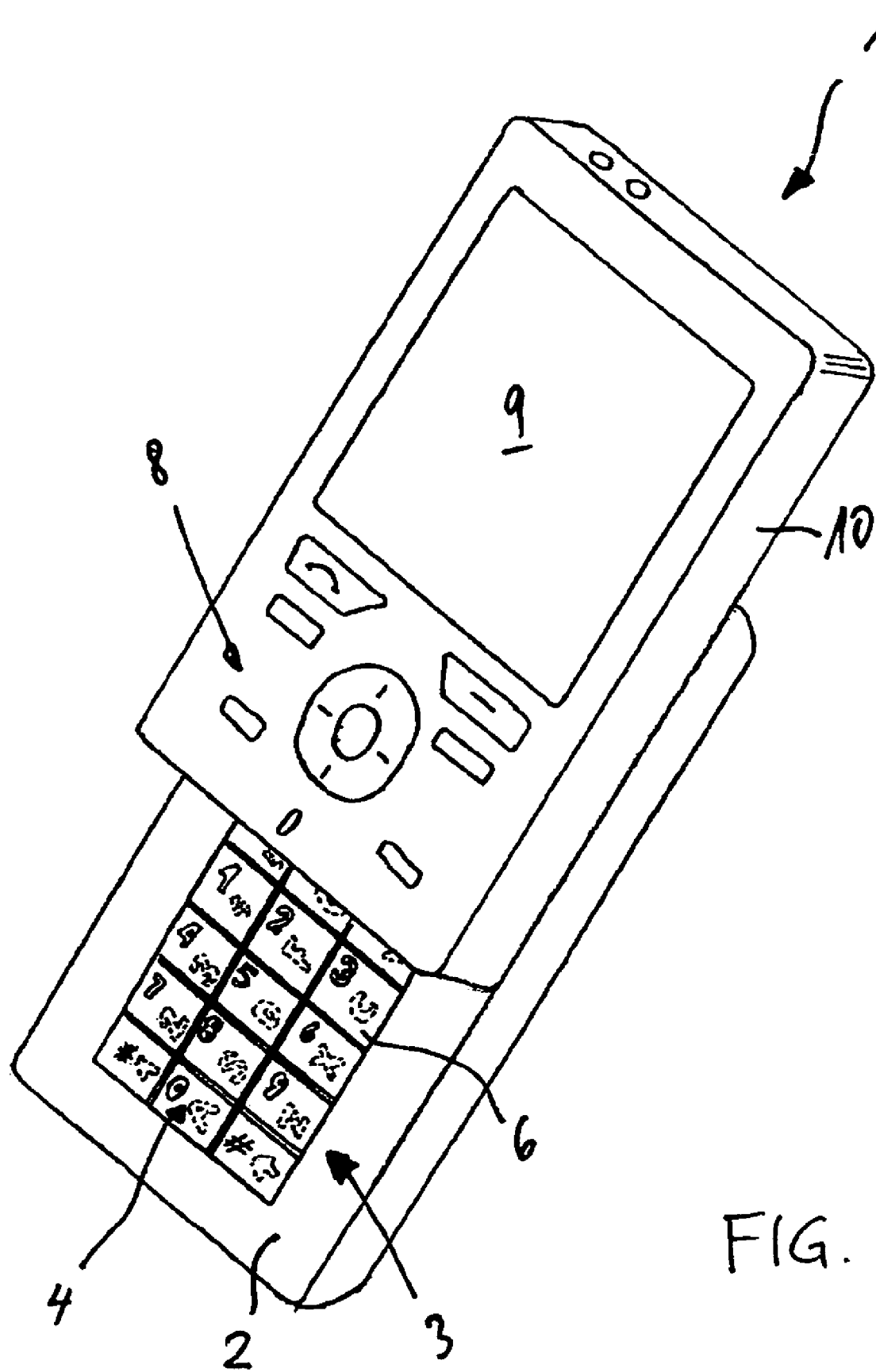
FIGS. 1, 2 show the same device with the same slideable layer extracted in two different positions
Figure 2:
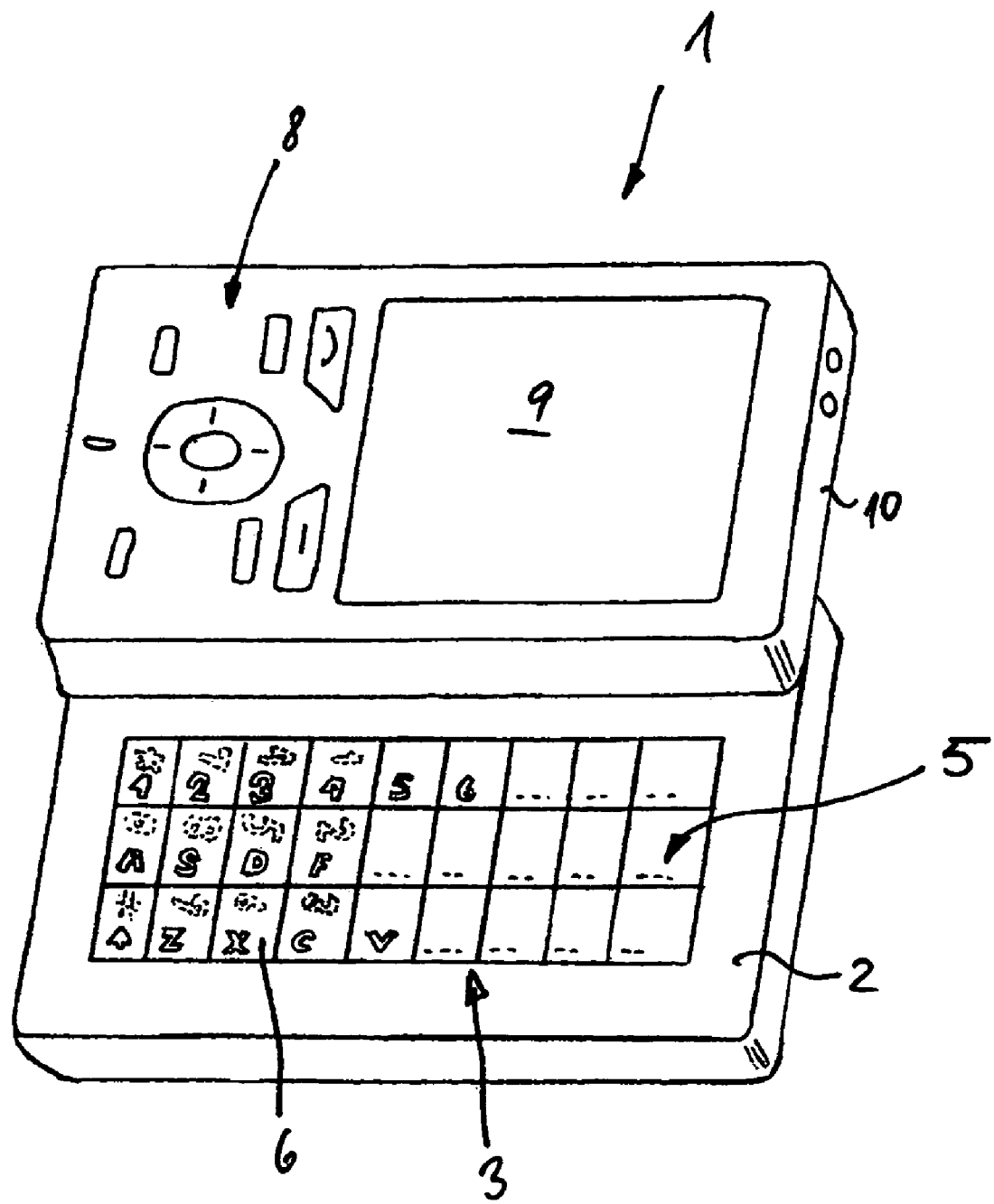

The FIGS. 1 and 2 show a preferred application of the inventive layer in an electronic device 1: in a cell phone. Both figures disclose the same cell phone with the same layer 2 extracted in two different directions. In this embodiment the layer 2 contains a keypad 3. The disclosed keypad 3 contains several mechanicals keys 6, but it is also conceivable that the keypad 3 contain just pressure sensors. The mechanical keys 6 or the conceivable pressure-sensor-keypad contain preferably piezo sensors. With the layer 2 extracted from the main casing 10 in the way showed in FIG. 1, the keypad 3 shows the display 4 in portrait format. The same keypad 3 can put on view another display 5, once the layer 2 is extracted in the other direction. In this way the keypad 3 shows the display 5 in the landscape format. In the landscape format, having more keys available, the cell phone can be used as a handheld or a pocket-PC. The keypad 3 in the landscape format can be equivalent to a miniaturized PC-keyboard with equivalent functions.

It should be noticed, that if the keypad 3 is extracted in the portrait-format, showing the display 4, only a part of the keys of the entire keypad 3 are exposed to the user and available for the manipulation of the electronic device, the other keys remain actually hidden under the main casing 10.

From the FIGS. 1 and 2 it can be easily realized how—in a preferred embodiment of the invention—the single keys 6 are enabled to display different signs or the same sign depending on the direction the layer 2 is extracted. Each key 6, the FIGS. 1 and 2 disclose mechanical keys, contains in fact two letters on its surface. However, only one of them is illuminated at a time.

While one is illuminated, the other remains hidden due to the missing contrast of the surrounding surface of the button (see dashed signs onto the keys of the FIGS. 1 and 2).

It is conceivable, that the single keys 6 are enabled to display more than two signs, e.g. four signs: One sign for each direction the layer 2 is extractable out of the main casing 10. It would also be possible, that the single keys 6 are enabled to disclose more that 4 signs, e.g. by providing each key-surface with a kind of digital display (not showed in the figures). This would make sense in the case the same keypad should be used for a multitude of applications, which requires keys showing different functions.

The figures display further a display 9 on the surface of the cell phone. This element is preferably enabled to display its content corresponding to the direction the layer 2 is extracted from main casing 10, meaning in portrait or landscape-format.

The buttons 8 next to the display might also be used for different purposes, depending if and in which direction the layer 2 is extracted.

Figure 3:
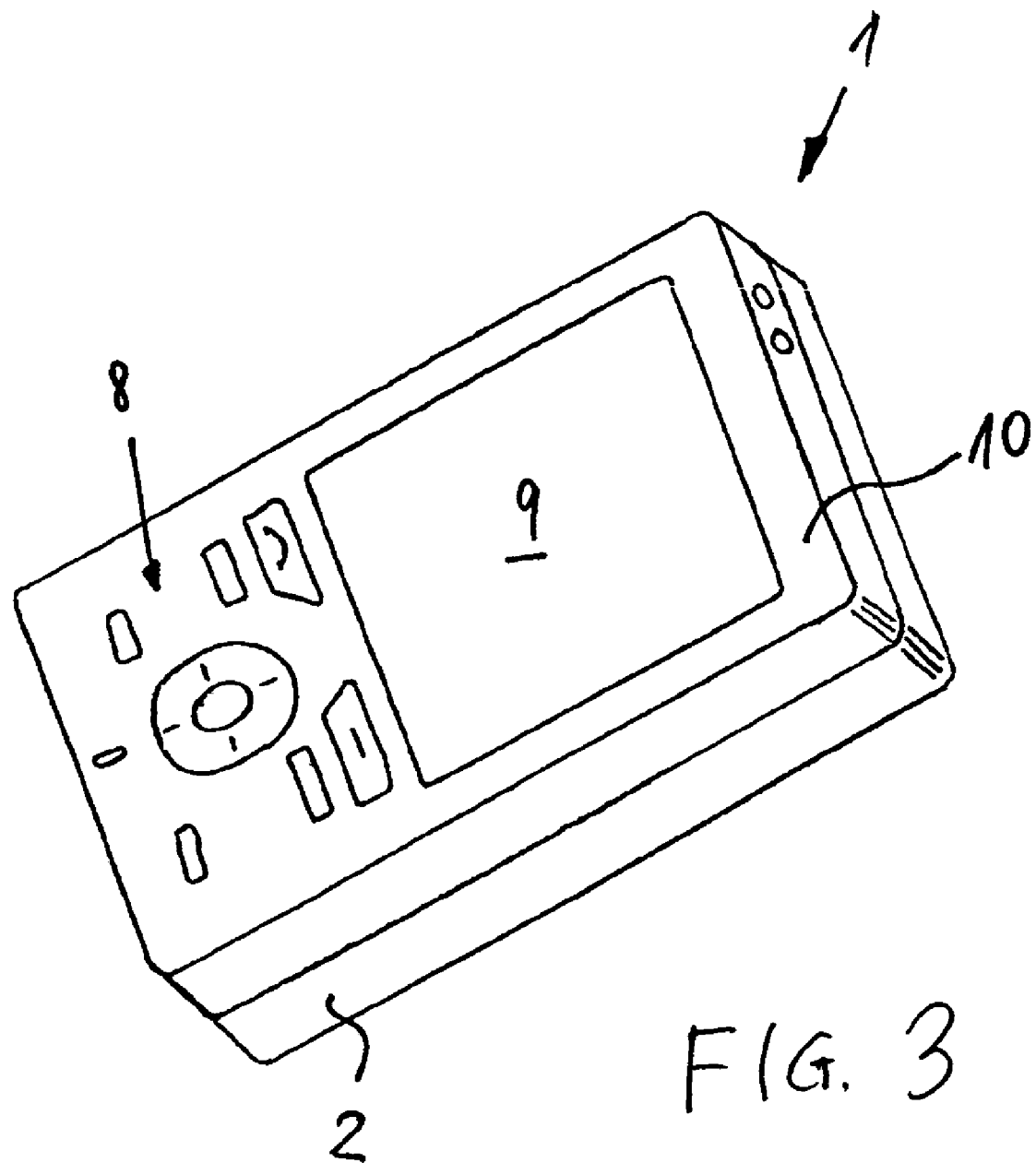
FIG. 3 shows the layer integrally retracted in its rest position

The FIG. 3 shows the same device as the forgoing figures. Here the layer 2 is integrally retracted in its rest position within the main casing 10 or aligned to the main casing 10. In this configuration, the electronic device 1 has a considerably reduced, small size and is suitable for being carried in pockets. The device might be usable even in this configuration, meaning for calling or receiving calls, though not with all the options available with the keypad extracted.

Figure 4:
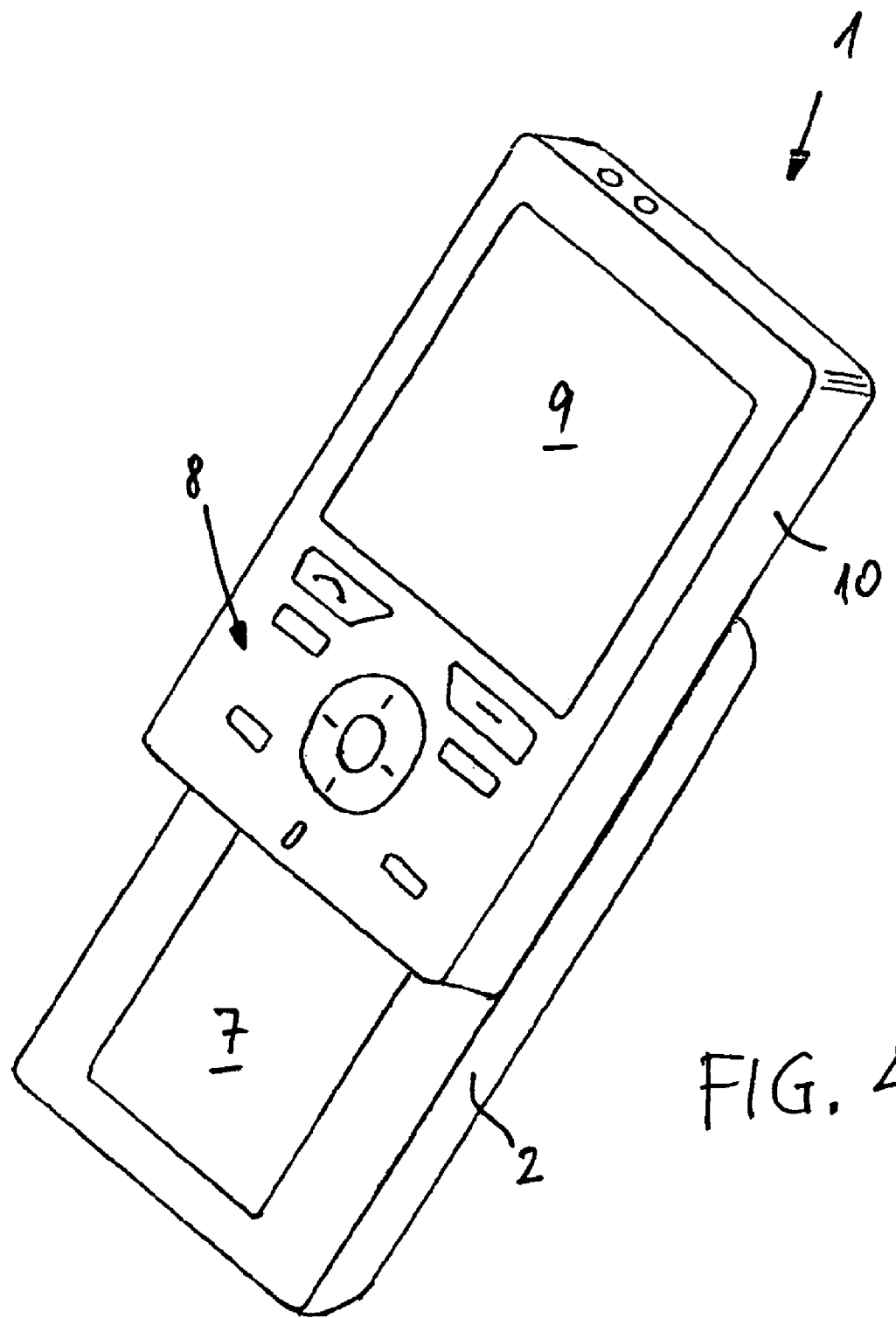
FIG. 4 shows an electronical device containing a touch-screen instead of a keypad FIG. 5 a possible configuration for the sliding mechanism

The FIG. 4 shows a cell phone containing a touchscreen 7 instead of a conventional keypad as in the forgoing figures. The use of a touchscreen instead of a keypad is a very convenient solution for the invention, since a touch-screen is able to show several different displays, e.g. different virtual keypads, one for each direction the layer 2 is extracted. Analogous to the FIGS. 1 and 2, the layer 2 containing the touchscreen 7 can be extracted from the main casing 10 in at least 2 directions, preferably in 4 directions. The illustrated buttons 8 might also change their function; depending in which direction the layer 2 is extracted. In a particular application of the invention, in which the electronic device, e.g. cell phone, is used as a game console, the touchscreen 7 can also be used for displaying a game.

Figure 5:
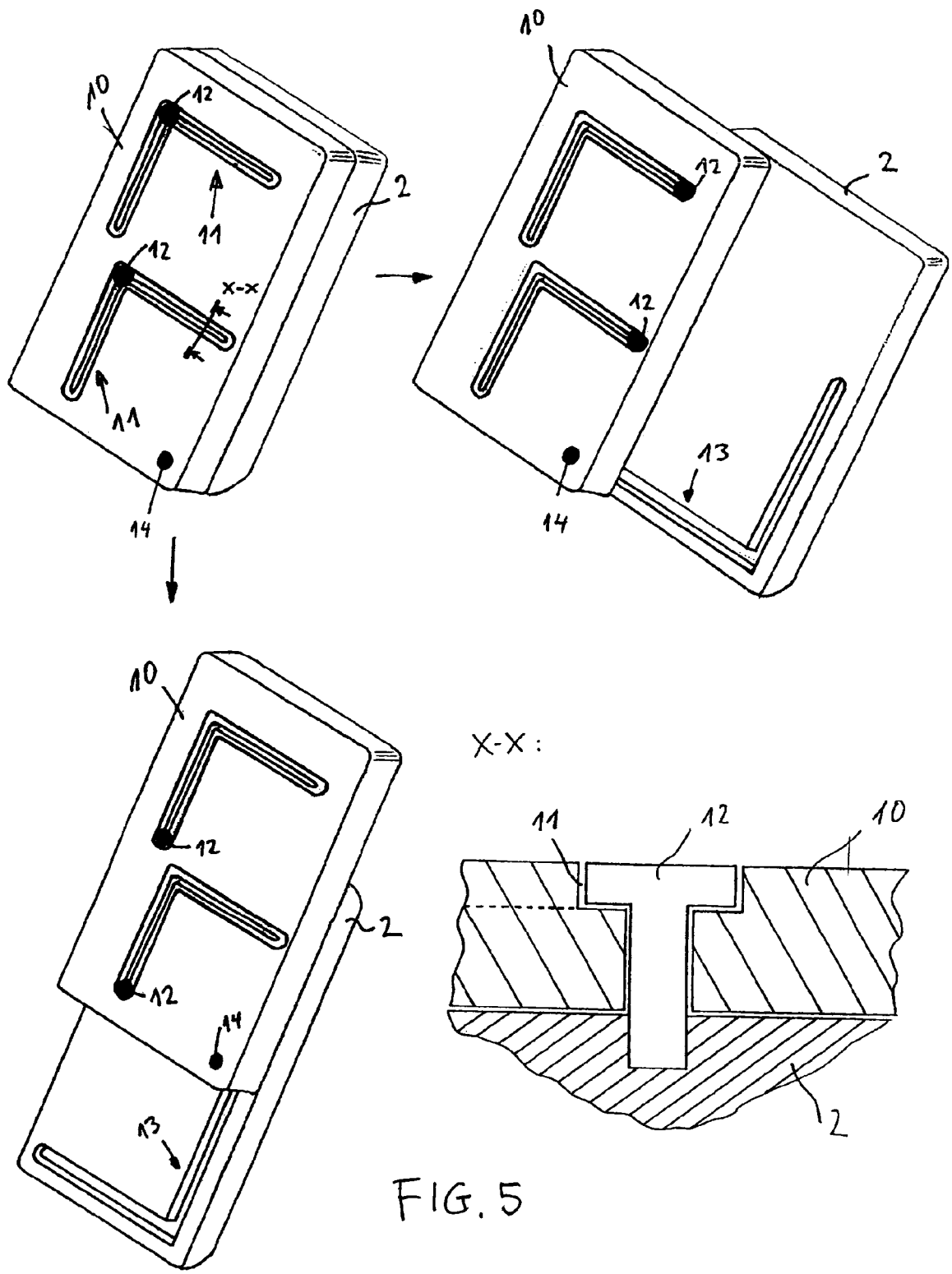

The FIG. 5 shows one of several possible sliding mechanism for the inventive purpose. The layer 2 and the main casing 10 are displayed schematically, meaning without any additional elements shown, except for the sliding mechanism.

To allow the movement of the layer 2, the main casing 10 contains two L-shaped guide conducts, conduits, or channels 11, in which two guide pins 12 are slideably arranged. The guide pins 12 are attached to the movable layer 2. The guide conducts, conduits, or channels 11 and the guide pins 12 have a form-locking design (see cross section X-X), meaning that the guide pins 12—and therefore the entire layer 2—are only moveable along the L-shaped guide conducts, conduits, or channels 11. To strengthen the described sliding mechanism and secure the movement of the layer 2, the main casing 10 can as well be equipped with a guide pin 14, while the layer 2 is provided with a corresponding L-shaped guide conduct, conduit, or channel 13. Equipped with those L-shaped guide conducts, conduits, or channels 11 and 13 and the matching guide pins 12 and, respectively, the layer 2 is perfectly extractable out of its rest position in two different directions.

It is conceivable to use T- or X-shaped guide conducts, conduits, or channels instead of the just described L-shaped ones. This would allow the layer to move in three or four directions.

The illustrated layer 2 and main casing 10 may contain on their surface further elements, for example displays, keypads, touchscreens, buttons etc. In practice, the sliding mechanism is preferably built within the layer 2 and therefore practically not visible from the outside.

The invention is not limited to the forgoing mentioned embodiments. It is especially not limited to be used within cell phones. Several other applications for the invention are imaginable, e.g. in handhelds, pocket-PC's, or other electronic appliances. The invention is especially suitable for being used in devices representing combinations of the mentioned appliances.

LEGEND

1 Electronic device
2 Layer
3 Keypad
4 Display of keypad when layer is slid out in portrait position
5 Display of keypad when layer is slid out in landscape position
6 Mechanical key
7 Touchscreen
8 Buttons
9 Display
10 Main casing
11 Guide conduct, conduit, or channel on the main casing
12 Guide pin
13 Guide conduct, conduit, or channel on the layer
14 Guide pin

The invention claimed is:

1. An apparatus comprising:
a main casing that comprises a display;
a layer comprising a keypad;
a moving mechanism configured to enable a user to move the layer to a rest position in which the layer is in a retracted state from an extracted position and back from the rest position to the extracted position, wherein
the keypad is covered by the main casing in the retracted state;
the layer has two extracted positions comprising:
a portrait position in which the layer is extracted out of the rest position in a first direction; and
a landscape position in which the layer is extracted out of the rest position in a second direction that is perpendicular to the first direction;
wherein at least a portion of the keypad is configured to be used from the first direction when the layer is in the portrait position and from the second direction when the layer is in the landscape position;
the moving mechanism further comprising:
a first guide pin at the layer and a corresponding first guide conduct at the main casing; and
a second guide pin at the main casing and a corresponding second guide conduct at the layer.

2. An apparatus according to claim 1, wherein the apparatus is a handheld appliance.

3. An apparatus according to claim 1, wherein the display is configured to be used from the first direction when the layer is in the portrait position and from the second direction when the layer is in the landscape position.

4. An apparatus according to claim 1, wherein the keypad comprises several mechanical keys.

5. An apparatus according to claim 4, wherein a single mechanical key of the keypad is configured to display different signs depending on whether the layer is in the portrait or landscape position.

6. An apparatus according to claim 1, wherein the keypad is at least partially formed of a touchscreen.

7. An apparatus according to claim 6, wherein the touchscreen is enabled to display different arrangements of keys depending on whether the layer is in the portrait or landscape position.

8. An apparatus according to claim 1, wherein the layer in its rest position is integrally retracted within the main casing or aligned with the main casing.

9. An apparatus according to claim 1, wherein the apparatus further comprises buttons on the main casing such that the buttons are accessible in each of the rest position, portrait position and landscape position.

10. An apparatus according to claim 9, wherein the apparatus is configured to change the function of the buttons depending on the position of the layer.

11. An apparatus according to claim 1, wherein the first guide conduct has an L-, or T-, or X-shaped form.

12. An apparatus according to claim 1, wherein that the second guide conduct has an L-, or T-, or X-shaped form.

13. An apparatus according to claim 1, wherein the first guide conduct and the corresponding first guide pin are form-locking.

14. An apparatus according to claim 1, wherein the second guide conduct and the corresponding second guide pin are form-locking.

* * * * *

UNITED STATES PATENT AND TRADEMARK OFFICE
CERTIFICATE OF CORRECTION

PATENT NO. : 7,671,836 B2
APPLICATION NO. : 11/028953
DATED : March 2, 2010
INVENTOR(S) : Jarmo Lehtonen It is certified that error appears in the above-identified patent and that said Letters Patent is hereby corrected as shown below:

On the Title Page, Item (56) References Cited, under "FOREIGN PATENT DOCUMENTS,"
"DE    203 17 864 I1   4/2004" should be --DE 203 17 865 U1--.
"KR    20-0325998    8/2003" should be --9/2003--.

On the Title Page, Item (56) on page 2, under "FOREIGN PATENT DOCUMENTS,"
please insert --WO    2004/086203    10/2004--.

Signed and Sealed this

Twenty-second Day of June, 2010

David J. Kappos
*Director of the United States Patent and Trademark Office*